(12) United States Patent
Johnson

(10) Patent No.: US 6,718,830 B1
(45) Date of Patent: Apr. 13, 2004

(54) CUSTOMIZED SPAN COMPENSATION OF SOI PRESSURE SENSOR

(75) Inventor: Russell L. Johnson, New Brighton, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/441,438

(22) Filed: May 20, 2003

(51) Int. Cl.[7] .................................................. G01L 9/16
(52) U.S. Cl. .......................................................... 73/754
(58) Field of Search .......................... 73/754, 755, 753; 307/443, 448, 450, 468, 465, 481, 303.1, 303.2; 326/111, 116, 117

(56) References Cited

U.S. PATENT DOCUMENTS 4,345,477 A    8/1982   Johnson
4,965,863 A  * 10/1990   Cray ........................... 326/116

* cited by examiner

Primary Examiner—William Oen
(74) Attorney, Agent, or Firm—Schiff Hardin LLP

(57) ABSTRACT

A sensor chip has a piezo-resistive bridge, a first resistor network that can be used for biasing when connected to an external amplifier, a second resistor network that can be used to set gain when connected to the external amplifier, and a leadout resistor that connects an output of the bridge to a common summing point of the two resistor networks. The summing point is connected to the non-inverting input of the external amplifier. The leadout resistor has a predetermined number of squares. A portion of the squares has a light implant and the remaining portion of the squares has a heavy implant. The ratio of the heavy and light implant portions provides customized span compensation of the amplified output for specific operating temperature ranges.

41 Claims, 8 Drawing Sheets

US 6,718,830 B1

CUSTOMIZED SPAN COMPENSATION OF SOI PRESSURE SENSOR

TECHNICAL FIELD OF THE INVENTION

The present invention relates to pressure sensors and, more particularly, to pressure sensors having span compensation customized for a specific operating temperature range where the customization can be changed for a different specific operating temperature range.

BACKGROUND OF THE INVENTION

Piezo-resistive pressure sensors are used in a wide variety of applications including automotive, industrial, medical, and environmental applications. Such sensors typically include a silicon diaphragm incorporating an ion implanted piezo-resistive Wheatstone bridge. An applied pressure bends the diaphragm and imbalances the bridge, producing a differential, ratiometric output signal that is proportional to the product of the change in resistance ($\Delta R/R$) caused by the pressure and the bridge excitation voltage.

Piezo-resistive pressure sensors formed in silicon are frequently fabricated using either bulk silicon or silicon-on-insulator (SOI) wafers. In the case of bulk silicon, the piezo-resistive pressure sensors are fabricated directly in the bulk silicon. In the case of SOI, the piezo-resistive pressure sensors are fabricated in the top silicon layer that is over the buried oxide layer of the SOI structure.

In the bridge configuration of piezo-resistive pressure sensors, the resistance of diagonally opposed legs varies equally and in the same direction as a function of the mechanical deformation caused by pressure. As the resistance of one set of diagonally opposed legs increases under pressure, the resistance of the other set decreases, and vice versa.

Bridge excitation in the form of a voltage or current is applied across two opposite nodes of the bridge. These nodes are usually referred to as excitation inputs or bridge drive inputs. Any change in resistance (such as due to a pressure input) is detected as a voltage difference across the other two nodes of the bridge, which are typically referred to as the bridge output.

For silicon based piezo-resistive pressure sensors, the voltage difference across the bridge output is quite small. Therefore, the bridge output is processed through a pressure channel that typically includes an amplifier to amplify the voltage difference across the bridge output. A feedback resistor around the amplifier is used to control the gain of the pressure channel that includes the amplifier. This feedback resistor is usually a light implant resistor compared to the heavy implant piezo-resistors that form the sensor bridge.

The full span output is defined as the difference in sensor outputs corresponding to the maximum and minimum applied pressures. The full span output (FSO) of an uncompensated piezo-resistive sensor bridge can exhibit a strong nonlinear dependence on temperature caused by the intrinsic nonlinear dependence of the piezo-resistor gauge factor ($\Delta R/R$) on temperature, whereas the zero pressure (null) offset and null offset dependence on temperature are maintained small in comparison. Thus, a sensor is typically compensated so that it can be used in practice.

Span shift with temperature is defined as the span as a function of temperature divided by the span at 25° C. Accordingly, span shift(T) in percent is equal to 100·[Span(T° C.)/Span(25° C.)]. The span shift curve is nonlinear with a negative slope with temperature as illustrated in FIG. 4 and is identified as K3. The span shift K3 is defined as the ratio of the pressure sensitivity ($\Delta R/R$) of the heavy implant piezo-resistive bridge as a function of temperature normalized to the value at 25° C. In equation form K3(T) is equal to $[\Delta R/R(T)]/[\Delta R/R(25°\ C.)]$ and may be expressed by the following 5$^{th}$ order polynomial:

$$K3(T)=-(6.265753E-14)\cdot T^{\wedge}5+(5.393845E-11)\cdot T^{\wedge}4-(2.440481E-08)\cdot T^{\wedge}3+(8.022881E-06)\cdot T^{\wedge}2-(2.585262E-03)\cdot T+(1.058300)$$

The magnitude of the slope decreases with increasing temperature. A typical span shift value at 25° C. is −0.25%/° C. Thus, in most applications, the sensor bridge output must be compensated, for the span shift(T) in particular, before it can be used in practice.

FIG. 4 also illustrates the temperature characteristics of the heavy implant resistors (K2) and the light implant resistors (K1). The temperature characteristics of the heavy implant resistors (K2) is defined as follows: K2=Ratio of the resistance of the heavy implant resistor as a function of temperature normalized to the value at 25° C. In equation form, K2=[Rheavy(T)]/[Rheavy(25° C.)] and may be expressed by the following 5$^{th}$ order polynomial:

$$K2(T)=-(3.018497E-14)\cdot T^{\wedge}5+(4.603604E-11)\cdot T^{\wedge}4-(2.282857E-08)\cdot T^{\wedge}3+(7.538750E-06)\cdot T^{\wedge}2-(2.252834E-05)\cdot T+(0.9963789)$$

The temperature characteristics of the light implant resistors (K1) is defined as follows: K1=Ratio of the resistance of the light implant resistor as a function of temperature normalized to the value at 25° C. In equation form, K1(T)=[Rlight(T)]/{Rlight(25° C.)] and may be expressed by the following 5$^{th}$ order polynomial:

$$K1(T)=-(8.171496E-14)\cdot T^{\wedge}5+(9.930398E-11)\cdot T^{\wedge}4-(3.557091E-08)\cdot T^{\wedge}3+(9.691127E-06)\cdot T^{\wedge}2+(2.958093E-03)\cdot T+0.923953$$

It is noted that the change in resistance of light implant resistors as a function of temperature K1(T) is much greater than that of the heavy implant resistors (K2(T).

SOI piezo-resistive pressure sensors that use the same design layout and the same ion implant concentrations as that used to fabricate bulk silicon piezo-resistive pressure sensors experience a positive span shift in the amplified pressure channel output as a function of temperature, whereas the span shift of the SOI piezo-resistive bridge-only has a negative slope with temperature, which is similar to that of bulk piezo-resistive sensors. This comparison indicates that the bridge span shift has been over-compensated by the positive temperature dependant gain of the amplifier. This over-compensation of span shift is primarily due to the higher positive TCR (temperature coefficient of resistance) of the light implant (high TCR) resistor elements in the SOI construction as used in the gain and feedback resistor networks which in turn causes an increase in the temperature dependent gain of the amplifier. As a result, the amplified pressure sensor output span is changed from being under-compensated to being over-compensated as shown in FIG. 5.

For example, in bulk silicon devices, the positive TCR of the light implant feedback (gain) resistor in the pressure channel compensates approximately 85% of the negative temperature coefficient (TC) of the heavy implant pressure bridge's span shift, as shown by the curve with the delta points, which results in the amplified output to be under-compensated by approximately 15% as shown by the curve with the square points. However, for SOI devices, the increase in the TCR of the light implant gain resistor causes an over-compensation of span shift with temperature as shown by the curve with the circle points. As shown in FIG. 5, the approximate +23% span shift of the bridge output (the curve with the delta points) at −55° C. is over-compensated to approximately −3% at the amplified output. Similarly, the approximate −28% span shift of the bridge output at +225° C. is over-compensated to approximately +7% at the amplified output.

Known techniques have been implemented to reduce the effect of span shift over-compensation. For example, in one technique, the dopant concentration of the SOI light implant process can be reduced to provide a lower TCR and a lower sheet resistivity. This process requires extensive re-layout of all of the light implant elements, processing of product for verification, and the need to have a third implant variable in the production wafer fabrication.

In another technique, the effective TCR of all of the light implant feedback and bias resistors in the pressure channel is reduced by making a certain percentage of these elements heavy implant elements. This process requires extensive re-design and re-layout of all the feedback and bias resistors, and could jeopardize the exact tracking of the $R_{feedback}/R_{bias}$ ratio required for high performance and long term stability.

Accordingly, these known techniques are complex and are not practical.

The present invention optimizes span compensation that may be customized for a specific operating temperature range and permits re-customization for a different operating temperature range. A benefit of the present invention is that the same ion implant concentrations that are common to both bulk silicon and SOI pressure sensors can be retained.

SUMMARY OF THE INVENTION

According to one aspect of the present invention, a sensor chip has first, second, third, fourth, fifth, and sixth sensor nodes and comprises a piezo-resistive bridge and first, second, third, fourth, fifth, and sixth conductive paths. The piezo-resistive bridge has first and second input nodes and first and second output nodes. The first conductive path connects the first input node to the first sensor node. The second conductive path connects the second input node to the second sensor node. The third conductive path connects the first output node to the third sensor node. The fourth conductive path connects the second output node to the fourth sensor node, the fourth conductive path includes a leadout resistance, a portion of the leadout resistance is formed as a light implant resistance, and the remainder of the leadout resistance is formed as a heavy implant resistance. The fifth conductive path connects the fourth sensor node to the fifth sensor node, and the fifth conductive path includes a bias resistance. The sixth conductive path connects the fourth sensor node to the sixth sensor node, and the sixth conductive path includes a feedback resistance.

According to another aspect of the present invention, a sensing system comprises a resistive sensor bridge, an amplifier, and first, second, third, fourth, fifth, and sixth conductive paths. The resistive sensor bridge has first and second input nodes and first and second output nodes. The amplifier has negative and positive inputs and an output. The first conductive path connects the first input node to a first source. The second conductive path connects the second input node to a reference potential. The third conductive path connects the first output node to the positive input of the amplifier. The fourth conductive path connects the second output node to the negative input of the amplifier, the fourth conductive path includes a leadout resistance, a portion of the leadout resistance is formed as a light implant resistance, and the remainder of the leadout resistance is formed as a heavy implant resistance. The fifth conductive path connects a second source to the negative input of the amplifier, and the fifth conductive path includes a bias resistance. The sixth conductive path connects the output of the amplifier to the negative input of the amplifier, and the sixth conductive path includes a feedback resistance.

According to still another aspect of the present invention, a method of fabricating a sensor chip comprises the following: forming a resistive sensor having at least a first resistance and a second resistance, wherein the resistive bridge has first and second input nodes and at least one output node; forming a first conductive path connected to the first input node; forming a second conductive path connected to the second input node; and, forming a third conductive path connected to the output node, wherein the third conductive path comprises a third and fourth resistances, wherein each of the first, second, and third resistances is a heavy implant resistance, and wherein the fourth resistance is a light implant resistance.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
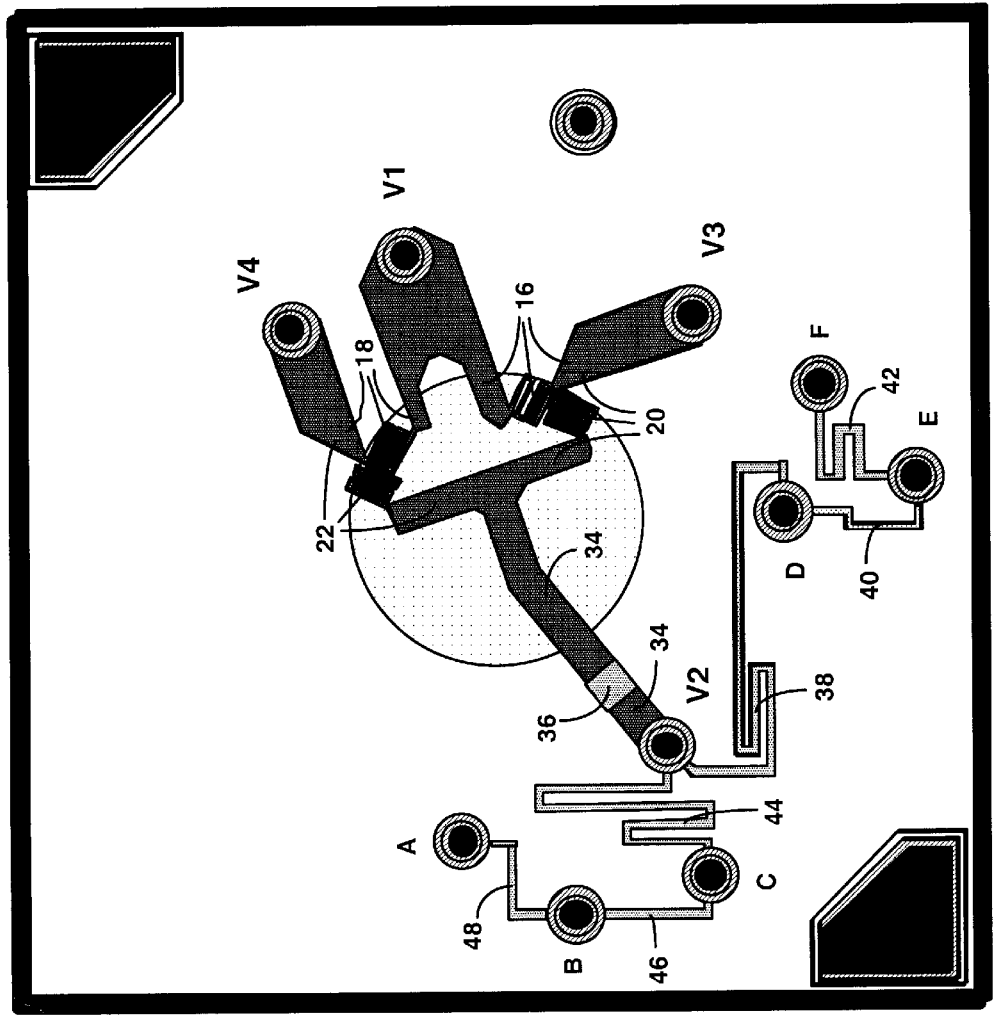
FIG. 1 illustrates a sensor chip layout according to an embodiment of the present invention.
Figure 2:
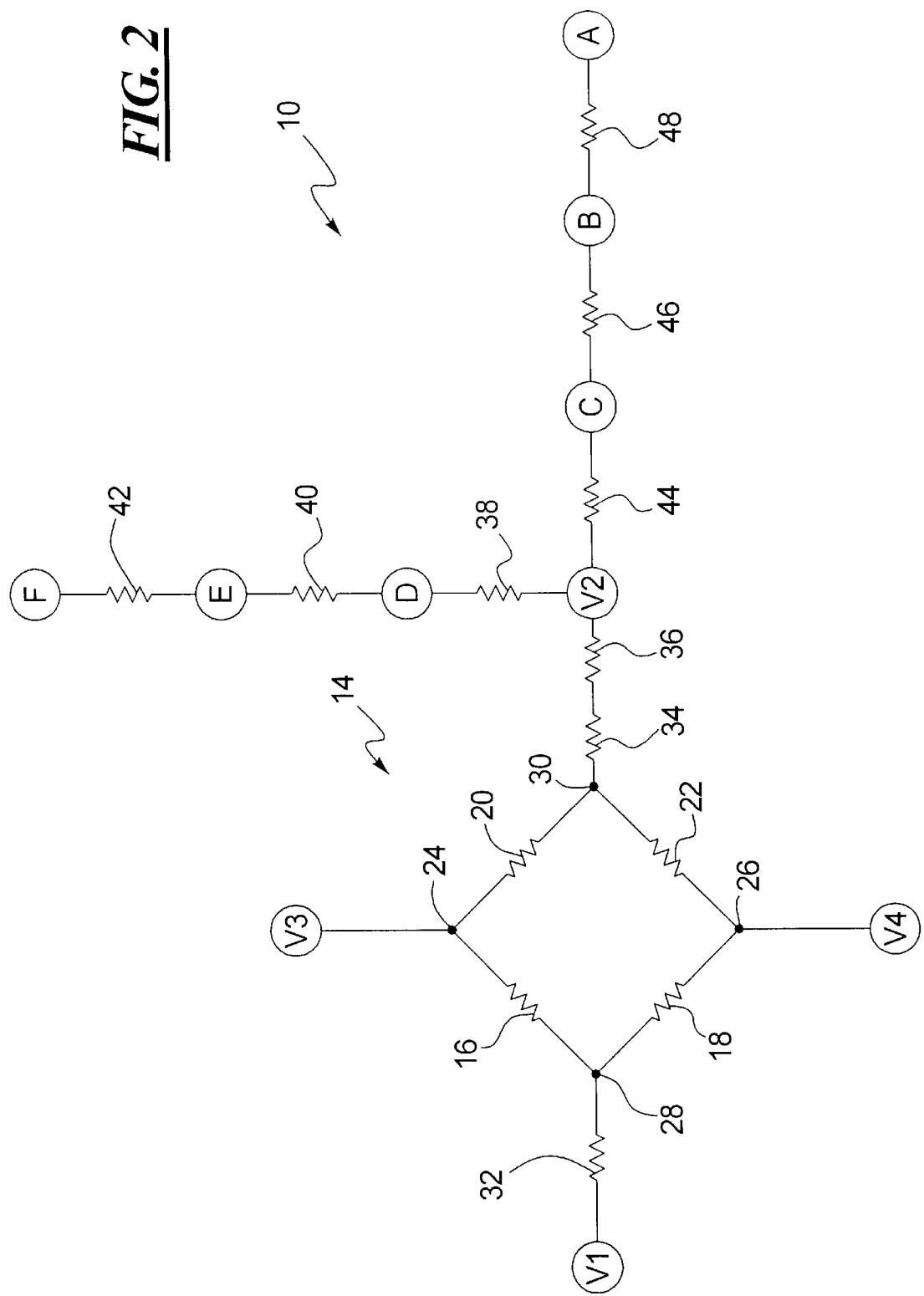
FIG. 2 illustrates the sensor chip layout of FIG. 1 in circuit schematic form.

As shown in FIGS. 1 and 2, a sensor chip 10 may be fabricated using standard SOI processing techniques. The sensor chip 10 includes a substrate 12, which may be the top silicon layer of an SOI structure. The substrate 12 is provided with terminals V1–V4 and A–F that permit external connections to be made to various points of the sensor chip 10. Also, the sensor chip 10 may be provided with an epitaxial layer (such as an n type epitaxial layer) and a shield layer (not shown) as are known in the art.

The sensor chip 10 includes a piezo-resistive bridge 14 having piezo-resistors 16, 18, 20, and 22 connected in a Wheatstone bridge configuration. The piezo-resistive bridge 14 has first and second excitation input nodes 24 and 26, and first and second output nodes 28 and 30. The piezo-resistor 16 is connected between the first excitation input node 24 and the first output node 28, the piezo-resistor 18 is connected between the second excitation input node 26 and the first output node 28, the piezo-resistor 20 is connected between the first excitation input node 24 and the second output node 30, and the piezo-resistor 22 is connected between the second excitation input node 26 and the second output node 30.

Also, the sensor chip 10 includes various leadout resistors and other resistors. Accordingly, a leadout resistor 32 connects the first output node 28 of the piezo-resistive bridge 14 to the terminal V1, and a pair of leadout resistors 34 and 36 connects the second output node 30 of the piezo-resistive bridge 14 to the terminal V2. (As described hereinafter, the leadout resistor 34 is a heavy implant resistor and the leadout resistor 36 is a light implant resistor. FIGS. 1 and 2 imply that the leadout resistor 36 is formed adjacent to the terminal V2. However, the light implant that the forms the leadout resistor 36 can instead be formed closer to the bridge so that a heavy implant region, then a light implant region, and then a heavy implant region in series connect the node 30 to the terminal V2. This arrangement would then be shown by three series resistors connected between the node 30 to the terminal V2. However, for simplicity, all such arrangements are represent by only two resistors, i.e., the resistors 34 and 36.) Additionally, a resistor 38 connects the terminal V2 to the terminal D, a resistor 40 connects the terminal D to the terminal E, a resistor 42 connects the terminal E to the terminal F, a resistor 44 connects the terminal V2 to the terminal C, a resistor 46 connects the terminal C to the terminal B, and a resistor 48 connects the terminal B to the terminal A. Further, the first excitation input node 24 is connected to the terminal V3, and the second excitation input node 26 is connected to the terminal V4.

During the formation of the sensor chip 10, the resistors 38, 40, 42, 44, 46, and 48, and the leadout resistor 36 are formed as light implant resistors, and the piezo-resistors 16, 18, 20, and 22 and the leadout resistor 34 are formed as heavy implant resistors. The implanting material, for example, may be Boron. As a result of this implanting, the resistors 38, 40, 42, 44, 46, and 48, the leadout resistors 32, 34, and 36, and the piezo-resistors 16, 18, 20, and 22 each have a predetermined resistivity.

The ratio of the resistivity of a light implant resistor to the resistivity of a heavy implant resistor, for example, may be on the order of seven to one. In a first example, a light implant resistor may have a resistivity of 860 ohms per square, and a heavy implant resistor may have a resistivity of 120 ohms per square. Thus, in this first example, each of the resistors 38, 40, 42, 44, 46, and 48, and the leadout resistor 36 may have a resistivity of 860 ohms per square, and each of the piezo-resistors 16, 18, 20, and 22 and the leadout resistors 32 and 34 may have a resistivity of 120 ohms per square. In a second example, a light implant resistor may have a resistivity of 2064 ohms per square, and a heavy implant resistor may have a resistivity of 288 ohms per square. Thus, in this second example, each of the resistors 38, 40, 42, 44, 46, and 48, and the leadout resistor 36 may have a resistivity of 2064 ohms per square, and each of the piezo-resistors 16, 18, 20, and 22 and the leadout resistors 32 and 34 may have a resistivity of 288 ohms per square. However, other ratios and/or resistivities may be used.

Moreover, the dopant concentration of the light implant resistor is the same for both resistivities of 860 and 2045 ohms per square. Likewise, the dopant concentration of a heavy implant resistor is the same for both resistivities of 120 and 288 ohms per square. For example, the light implant resistivities may have a dopant concentration in the order of $3 \times 10^{17}$ ions per cubic cm, and the heavy implant resistivities may have a dopant concentration in the order of $1 \times 10^{19}$ ions per cubic cm. Both combinations of light and heavy implant resistivities of the two above examples are achieved using the same wafer mask set and wafer process. The change in the resistivity levels is determined by the parameters of the wafer starting material that control the finished thickness of the resistors.

Figure 3:
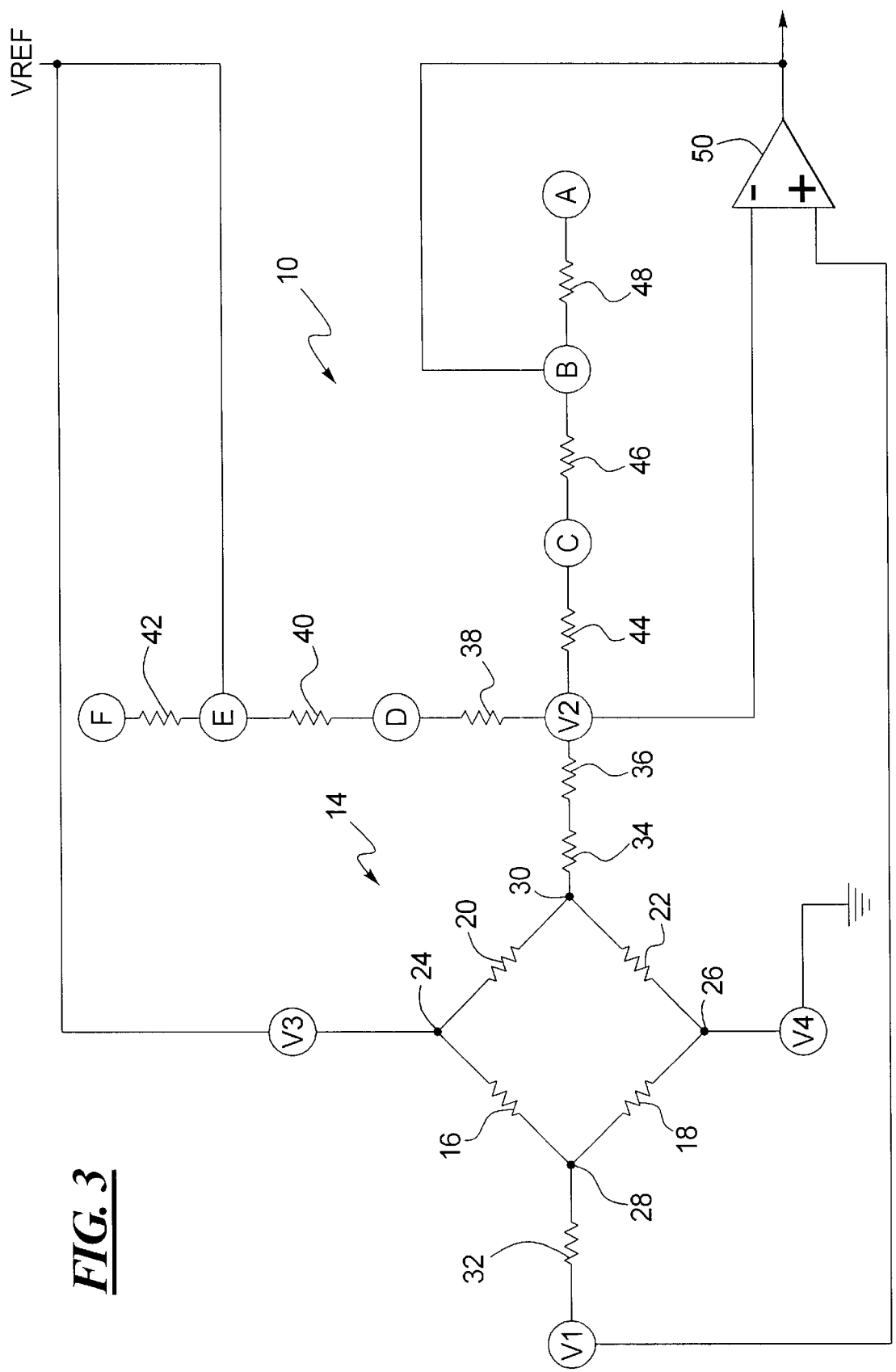
FIG. 3 illustrates the sensor chip layout of FIG. 1 in circuit schematic form and coupled to an external amplifier.
Figure 4:
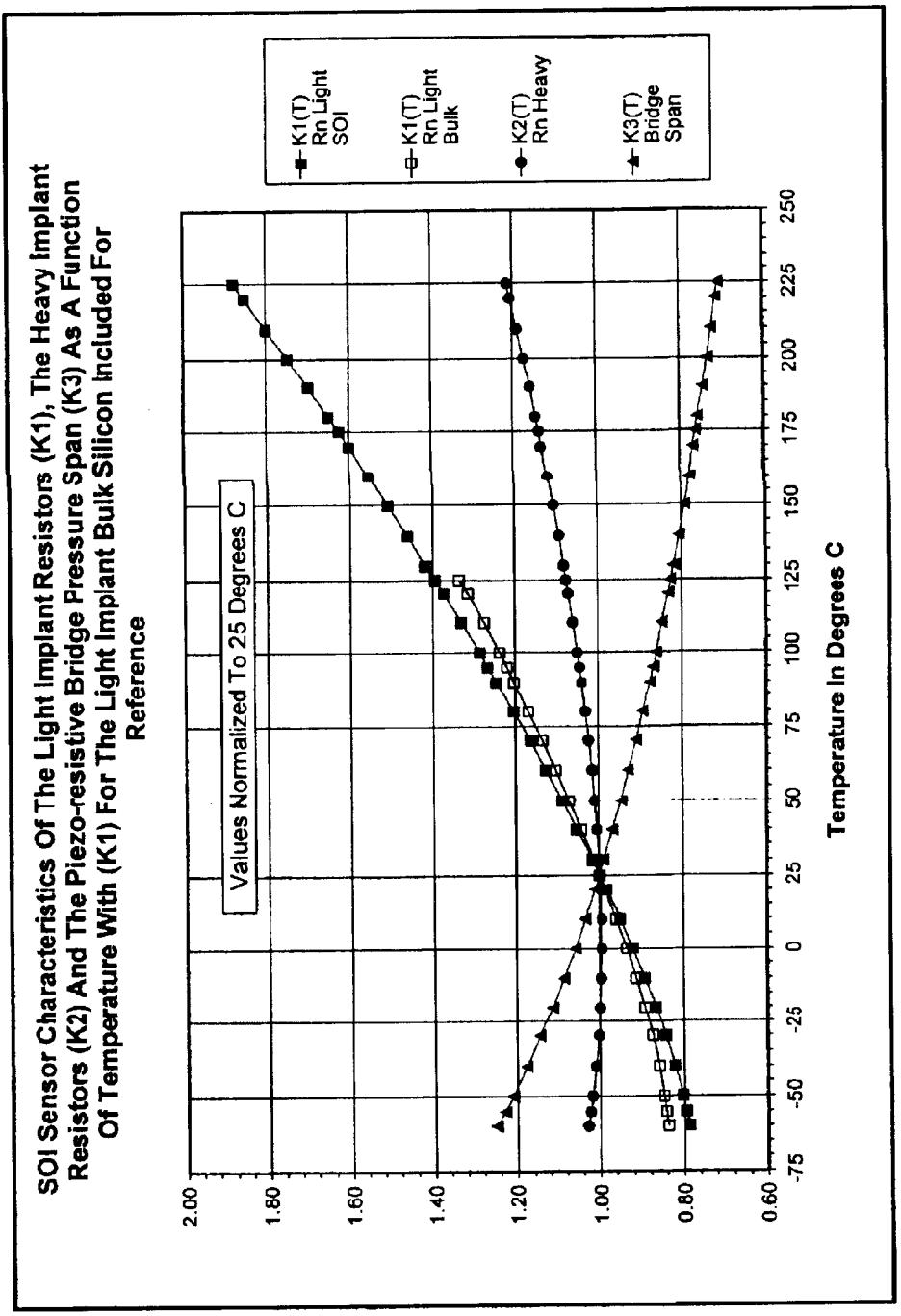
FIG. 4 illustrates the temperature characteristics of heavy implant resistors and of light implant resistors and further illustrates the span shift of a heavy implant piezo-resistive bridge as a function of temperature.
Figure 5:
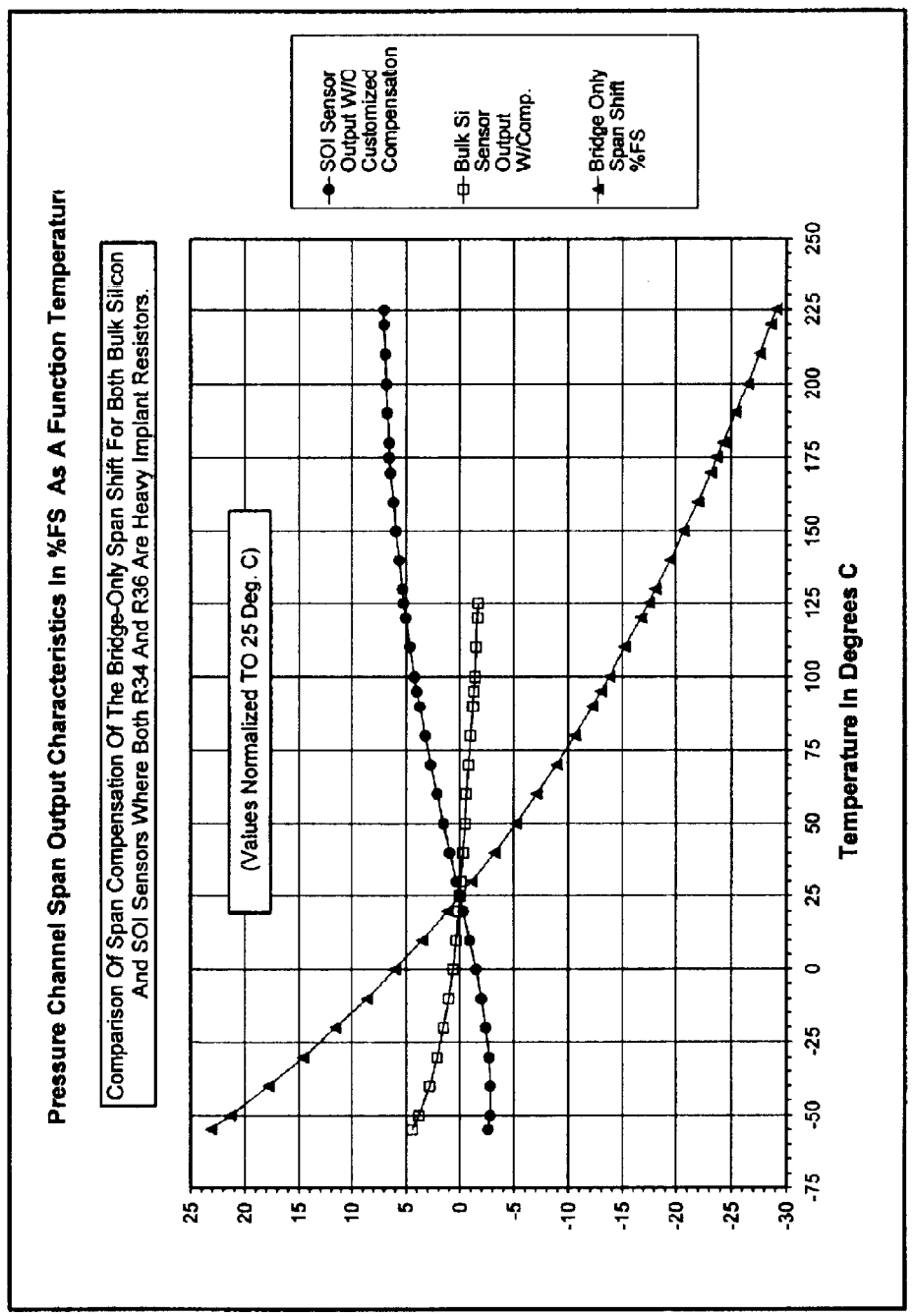
FIG. 5 illustrates the span shift of the output of an SOI sensor without the customized compensation provided by the present invention, the span shift of the output of a bulk silicon sensor with compensation, and the span shift in the sensor bridge only case.

By appropriate external connection to the terminals V1–V4 and A–F, the sensor chip 10 may be coupled to a pressure channel that includes an external amplifier. Thus, as shown in FIG. 3, the terminal V1 is externally connected to a positive (non-inverting) input of an external amplifier 50, the terminal V2 is externally connected to a negative (inverting) input of the external amplifier 50, the terminals V3 and E are externally connected to an external excitation source $V_{ref}$, the terminal V4 is externally connected to an external reference potential such as ground, and the terminal B is externally connected to the output of the external amplifier 50. The output of the external amplifier 50 is designated VP and is defined by the following equation, which shows the relationship of the resistors 34 and 36 to the amplifier gain:

$$V\text{Pout as \% of } V\text{ref} = 100 \cdot \{1 + (R44 + R46) \cdot [(1/R22) \cdot (1 - (R16 \cdot R22)/(R18 \cdot R20))/(1 + ((R34 + R36)/R20) \cdot (1 + R20/R22)) - (1/(R38 + R40)) \cdot (R16/R18)]\}/[1 + (R16/R18)]$$

As shown in FIG. 3, the leadout resistors 34 and 36 connect the second output node 30 of the piezo-resistive bridge 14 to the negative input of the external amplifier 50 and, therefore, are part of the input resistance $R_{in}$ that partially determines the gain of the external amplifier 50. By lightly implanting a predetermined portion of the input resistance $R_{in}$ (i.e., the leadout resistor 36), the TCR of the input resistance $R_{in}$ can be made higher. This increase in the TCR of the input resistance $R_{in}$ reduces the rate of increase of the gain with increasing temperature thereby reducing the span shift discussed above. Accordingly, by using a light implant, for a portion of the input resistance $R_{in}$, span compensation can be customized while retaining the same geometry of the bridge and leadout resistors, while not changing any other part of the design of the sensor chip 10, and while using the same ion implant concentrations that are common to bulk silicon and SOI devices.

The resistors 38, 40, and 42 may be referred to as bias resistors. Any combination of these resistors may be selected in order to provide a desired bias to the terminal V2. The resistors 44, 46, and 48 may be referred to as feedback resistors. Any combination of these resistors may be selected in order to provide a desired feedback resistance for the external amplifier 50.

Table 1 shows a first example of the relative sizes and values for the piezo-resistors 16, 18, 20, and 22, the leadout resistors 32, 34, and 36, and the resistors 38, 40, 42, 44, 46, and 48.

TABLE 1

| Resistor | # of Squares | Resistivity (ohms/square) | Resistance (ohms) |
| --- | --- | --- | --- |
| 16 | 85.075 | 120 | 10,209 |
| 18 | 85.075 | 120 | 10,209 |
| 20 | 85.075 | 120 | 10,209 |
| 22 | 85.075 | 120 | 10,209 |
| 32 | 0.89 | 120 | 106.4 |
| 34 | 7.30 | 120 | 875.8 |
| 36 | 1.00 | 860 | 860.0 |

TABLE 1-continued

| Resistor | # of Squares | Resistivity (ohms/square) | Resistance (ohms) |
|---|---|---|---|
| 38 | 90.89 | 860 | 78,167.6 |
| 40 | 17.34 | 860 | 14,914.1 |
| 42 | 22.37 | 860 | 19,240.0 |
| 44 | 72.89 | 860 | 62,684.0 |
| 46 | 13.71 | 860 | 11,791.9 |
| 48 | 16.64 | 860 | 14,313.7 |

It is noted that the number of squares of the resistor 34 plus the number of squares of the resistor 36 equal is preferably constant (8.3 squares). Thus, if the number of squares of the resistor 36 is increased, for example, then the number of squares of the resistor 34 is decreased by the same amount.

Figure 6:
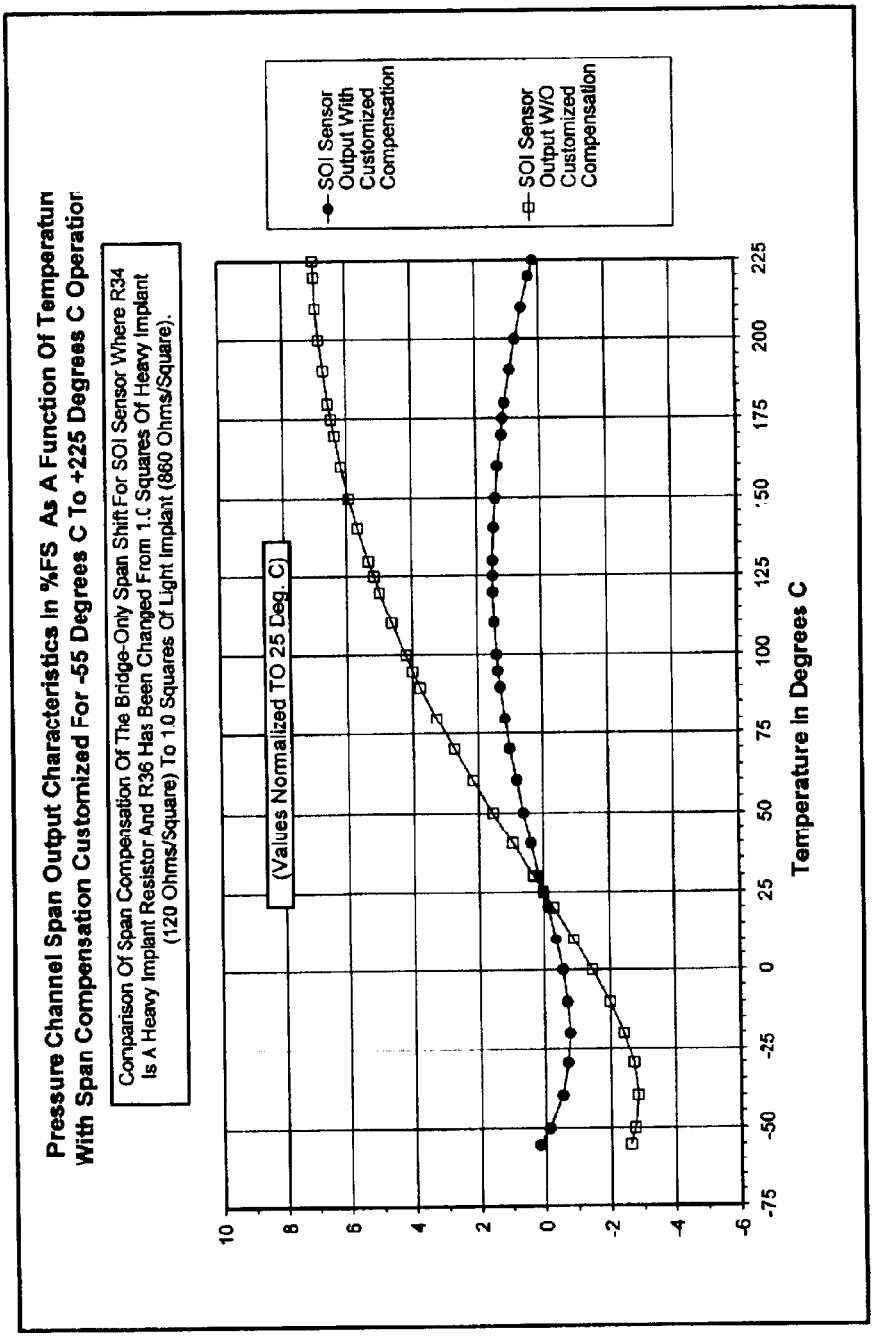
FIG. 6 compares the span shift of the output of an SOI sensor without the compensation of the present invention to the span shift of the output of an SOI sensor with the span shift compensation customized for one temperature range.
Figure 7:
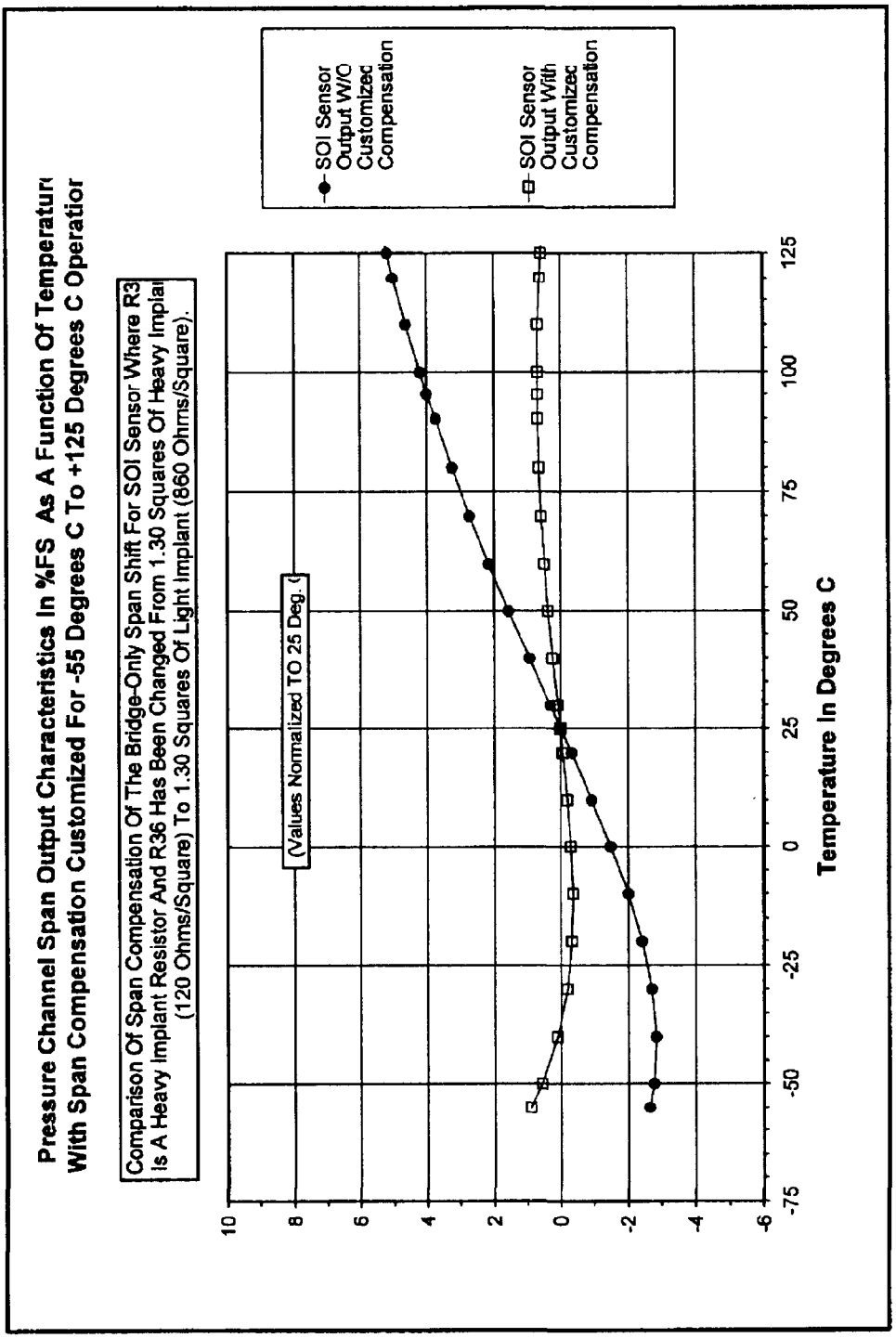
FIG. 7 compares the span shift of the output of an SOI sensor without the compensation of the present invention to the span shift of the output of an SOI sensor with the span shift compensation customized for another temperature range; and, FIG. 8 compares the span shift of the output of an SOI sensor without the compensation of the present invention to the span shift of the output of an SOI sensor with the span shift compensation customized for still another temperature range.
Figure 8:
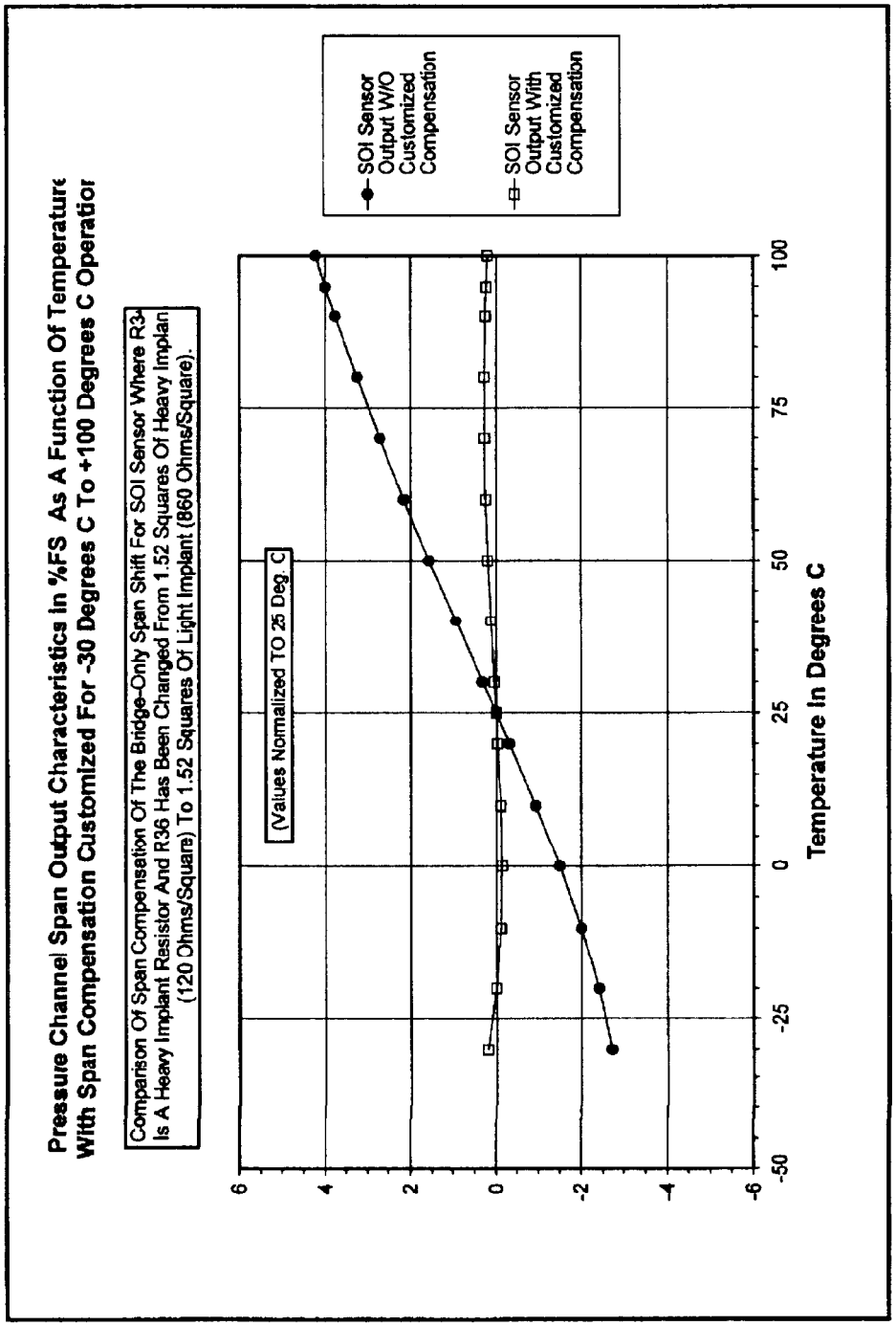

FIGS. 6, 7 and 8 are graphs that show the SOI sensor pressure channel's amplified output as a function of temperature, each illustrating a customized span compensation for a different temperature range.

In FIG. 6, for example, the span compensation has been customized for the temperature range of −55° C. to +225° C. The curve with the solid circle points shows the span output over temperature without customized compensation where both of the leadout resistors 34 and 36 are heavy implant resistors. The curve with the non-solid circle points shows the span output with customized span compensation resulting when the leadout resistor 36 is changed from being one square of a heavy implant resistor to one square of light implant resistor. At +225° C., for example, the span shift is reduced from approximately +7% to near zero, and at −55° C. the span shift is reduced from approximately −3% to near zero. Over the entire range of −55° C. to +225° C., the span shift error is less than approximately 1.5%. As can be seen, making the leadout resistor 36 a light implant resistor, customized for −55° C. to +225° C. according to the present invention, significantly reduces span shift.

In FIG. 7, for example, the span compensation has been customized for the temperature range of −55° C. to +125° C. The curve with the solid circle points shows the span output over temperature without customized compensation where both of the leadout resistors 34 and 36 are heavy implant resistors. The curve with the non-solid circle points shows the span output with customized span compensation resulting when the leadout resistor 36 is changed from being 1.3 squares of a heavy implant resistor to 1.3 squares of light implant resistor. At +125° C., for example, the span shift is reduced from approximately +5% to approximately +0.5%, and at −55° C. the span shift is reduced from approximately −3% to approximately +1.0%. Over the entire range of −55° C. to +125° C., the span shift error is less than approximately 1.0%. As can be seen, making the leadout resistor 36 a light implant resistor, customized for −55° C. to +125° C. operation according to the present invention, significantly reduces span shift.

In FIG. 8, for example, the span compensation has been customized for the temperature range of −30° C. to +100° C. The curve with the solid circle points shows the span output over temperature without customized compensation where both of the leadout resistors 34 and 36 are heavy implant resistors. The curve with the non-solid circle points shows the span output with customized span compensation resulting when the leadout resistor 36 is changed from being 1.52 squares of a heavy implant resistor to 1.52 squares of light implant resistor. At +100° C., for example, the span shift is reduced from approximately +4.2% to approximately +0.2%, and at −55° C. the span shift is reduced from approximately −3% to approximately +0.2%. Over the entire range of −30° C. to +100° C., the span shift error is less than approximately 0.25%. As can be seen, making the leadout resistor 36 a light implant resistor, customized for −3° C. to +100° C. operation according to the present invention, significantly reduces span shift.

Table 2 shows a second example of the relative sizes and values for the piezo-resistors 16, 18, 20, and 22, the leadout resistors 32, 34, and 36, and the resistors 38, 40, 42, 44, 46, and 48.

TABLE 2

| Resistor | # of Squares | Resistivity (ohms/square) | Resistance (ohms) |
|---|---|---|---|
| 16 | 85.075 | 285 | 24,246.4 |
| 18 | 85.075 | 285 | 24,246.4 |
| 20 | 85.075 | 285 | 24,246.4 |
| 22 | 85.074 | 285 | 24,246.4 |
| 32 | 0.89 | 285 | 252.7 |
| 34 | 7.30 | 285 | 2,080.0 |
| 36 | 1.00 | 2,045 | 2,045.0 |
| 38 | 90.89 | 2,045 | 185,875.4 |
| 40 | 17.34 | 2,045 | 35,464.4 |
| 42 | 22.37 | 2,045 | 45,750.9 |
| 44 | 72.89 | 2,045 | 149,056.7 |
| 46 | 13.71 | 2,045 | 28,040.0 |
| 48 | 16.64 | 2,045 | 34,036.7 |

Certain modifications of the present invention have been described above. Other modifications of the invention will occur to those skilled in the art. For example, the present invention has been described above in relation to pressure sensors. However, the present invention may be used on other types of sensors such as temperature sensors.

Also, the terminals V1–V4 and A–F are described above as terminals that permit external connections to be made to the sensor chip 10, and the external amplifier 50 is referred to as an external amplifier. However, the terminals V1–V4 and A–F may instead be referred to as sensor nodes. Such sensor nodes can be terminals that permit external connections to be made to the sensor chip 10, or such sensor nodes can be simply connections points indicating internal connections of the sensor chip 10. In this latter case, the external amplifier 50 may be an internal amplifier formed as part of the sensor chip 10, or the amplifier may be an external amplifier connected to the sensor chip 10 through the use of external connections.

Moreover, the sensor chip 10 is described above as including a Wheatstone pressure bridge. However, the pressure bridge of the sensor chip 10 may instead include fewer that four resistors. For example, the pressure bridge of the sensor chip 10 may include a half bridge having two resistors connected between excitation inputs and having a junction forming an output.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A sensor chip having first, second, third, fourth, fifth, and sixth sensor nodes, the sensor chip comprising:

a piezo-resistive bridge having first and second input nodes and first and second output nodes;

a first conductive path connecting the first input node to the first sensor node;

a second conductive path connecting the second input node to the second sensor node;

a third conductive path connecting the first output node to the third sensor node;

a fourth conductive path connecting the second output node to the fourth sensor node, wherein the fourth conductive path includes a leadout resistance, wherein a portion of the leadout resistance is formed as a light implant resistance, and wherein the remainder of the leadout resistance is formed as a heavy implant resistance;

a fifth conductive path connecting the fourth sensor node to the fifth sensor node, wherein the fifth conductive path includes a bias resistance; and, a sixth conductive path connecting the fourth sensor node to the sixth sensor node, wherein the sixth conductive path includes a feedback resistance.

2. The sensor chip of claim 1 wherein the piezo-resistive bridge comprises four legs each containing a heavy implant piezo-resistance, and wherein the bias resistance and the feedback resistance each comprises a light implant resistance.

3. The sensor chip of claim 2 wherein each of the heavy implant resistances has a first resistivity, wherein each of the light implant resistances has a second resistivity, and wherein a ratio of the first resistivity to the second resistivity is on the order of one to seven.

4. The sensor chip of claim 1 wherein the leadout resistance comprises a first leadout resistance, wherein the third conductive path comprises a second leadout resistance, and wherein the second leadout resistance comprises a heavy implant resistance.

5. The sensor chip of claim 4 wherein the piezo-resistive bridge comprises four legs each containing a heavy implant piezo-resistance, and wherein the bias resistance and the feedback resistance each comprises a light implant resistance.

6. The sensor chip of claim 5 wherein each of the heavy implant resistances has a first resistivity, wherein each of the light implant resistances has a second resistivity, and wherein a ratio of the first resistivity to the second resistivity is on the order of one to seven.

7. The sensor chip of claim 1 wherein the portion of the leadout resistance formed as a light implant resistance covers a first area, wherein the remainder of the leadout resistance formed as a heavy implant resistance covers a second area, and wherein a ratio of the number of squares of the first area to the number of squares of the second area is on the order of one to seven, and wherein the number of squares of the sum of the first and second areas is constant.

8. The sensor chip of claim 7 wherein the piezo-resistive bridge comprises four legs each containing a heavy implant piezo-resistance, and wherein the bias resistance and the feedback resistance each comprises a light implant resistance.

9. The sensor chip of claim 8 wherein each of the heavy implant resistances has a first resistivity, wherein each of the light implant resistances has a second resistivity, and wherein a ratio of the first resistivity to the second resistivity is on the order of one to seven.

10. The sensor chip of claim 7 wherein the leadout resistance comprises a first leadout resistance, wherein the third conductive path comprises a second leadout resistance, and wherein the second leadout resistance comprises a heavy implant resistance.

11. The sensor chip of claim 10 wherein the piezo-resistive bridge comprises four legs each containing a heavy implant piezo-resistance, and wherein the bias resistance and the feedback resistance each comprises a light implant resistance.

12. The sensor chip of claim 11 wherein each of the heavy implant resistances has a first resistivity, wherein each of the light implant resistances has a second resistivity, and wherein a ratio of the first resistivity to the second resistivity is on the order of one to seven.

13. The sensor chip of claim 1 wherein the heavy implant resistance has a first resistivity, wherein the light implant resistance has a second resistivity, and wherein a ratio of the first resistivity to the second resistivity is on the order of one to seven.

14. The sensor chip of claim 1 wherein the first, second, third, fourth, fifth, and sixth sensor nodes comprises corresponding first, second, third, fourth, fifth, and sixth terminals permitting external connections to be made to the sensor chip.

15. The sensor chip of claim 1 wherein the portion of the leadout resistance formed as a light implant resistance has a first area, wherein the remainder of the leadout resistance formed as a heavy implant resistance has a second area, and wherein a ratio of the first area to the second area is customized to a particular temperature range.

16. A sensing system comprising:

a resistive sensor bridge having first and second input nodes and first and second output nodes;

an amplifier having negative and positive inputs and an output;

a first conductive path connecting the first input node to a first source;

a second conductive path connecting the second input node to a reference potential;

a third conductive path connecting the first output node to the positive input of the amplifier;

a fourth conductive path connecting the second output node to the negative input of the amplifier, wherein the fourth conductive path includes a leadout resistance, wherein a portion of the leadout resistance is formed as a light implant resistance, and wherein the remainder of the leadout resistance is formed as a heavy implant resistance;

a fifth conductive path connecting a second source to the negative input of the amplifier, wherein the fifth conductive path includes a bias resistance; and, a sixth conductive path connecting the output of the amplifier to the negative input of the amplifier, wherein the sixth conductive path includes a feedback resistance.

17. The sensing system of claim 16 wherein the resistive sensor bridge comprises four legs each containing a heavy implant resistance, and wherein each of the bias resistance and the feedback resistance comprises a light implant resistance.

18. The sensing system of claim 17 wherein each of the heavy implant resistances has a first resistivity, wherein each of the light implant resistances has a second resistivity, and wherein a ratio of the first resistivity to the second resistivity is on the order of one to seven.

19. The sensing system of claim 16 wherein the leadout resistance comprises a first leadout resistance, wherein the third conductive path comprises a second leadout resistance, and wherein the second leadout resistance comprises a heavy implant resistance.

20. The sensing system of claim 19 wherein the resistive sensor bridge comprises four legs each containing a heavy implant resistance, and wherein the bias resistance and the feedback resistance each comprises a light implant resistance.

21. The sensing system of claim 20 wherein each of the heavy implant resistances has a first resistivity, wherein each of the light implant resistances has a second resistivity, and wherein a ratio of the first resistivity to the second resistivity is on the order of one to seven.

22. The sensing system of claim 16 wherein the portion of the leadout resistance formed as a light implant resistance covers a first area, wherein the remainder of the leadout resistance formed as a heavy implant resistance covers a second area, and wherein a ratio of the number of squares of the first area to the number of squares of the second area is on the order of one to seven, and wherein the number of squares of the sum of the first and second areas is constant.

23. The sensing system of claim 22 wherein the resistive sensor bridge comprises four legs each containing a heavy implant resistance, and wherein the bias resistance and the feedback resistance each comprises a light implant resistance.

24. The sensing system of claim 23 wherein each of the heavy implant resistances has a first resistivity, wherein each of the light implant resistances has a second resistivity, and wherein a ratio of the first resistivity to the second resistivity is on the order of one to seven.

25. The sensing system of claim 22 wherein the leadout resistance comprises a first leadout resistance, wherein the third conductive path comprises a second leadout resistance, and wherein the second leadout resistance comprises a heavy implant resistance.

26. The sensing system of claim 25 wherein the resistive sensor bridge comprises four legs each containing a heavy implant resistance, and wherein the bias resistance and the feedback resistance each comprises a light implant resistance.

27. The sensing system of claim 26 wherein each of the heavy implant resistances has a first resistivity, wherein each of the light implant resistances has a second resistivity, and wherein a ratio of the first resistivity to the second resistivity is on the order of one to seven.

28. The sensing system of claim 16 wherein the heavy implant resistance has a first resistivity, wherein the light implant resistance has a second resistivity, and wherein a ratio of the first resistivity to the second resistivity is on the order of one to seven.

29. The sensing system of claim 16 wherein the first and second sources are the same source.

30. The sensing system of claim 16 wherein the first, second, third, fourth, fifth, and sixth sensor nodes comprises corresponding first, second, third, fourth, fifth, and sixth terminals permitting external connections to be made to the sensor chip.

31. The sensor system of claim 16 wherein the portion of the leadout resistance formed as a light implant resistance has a first area, wherein the remainder of the leadout resistance formed as a heavy implant resistance has a second area, and wherein a ratio of the first area to the second area is customized to a particular temperature range.

32. A method of fabricating a sensor chip comprising:
forming a resistive sensor having at least a first resistance and a second resistance, wherein the resistive bridge has first and second input nodes and at least one output node;
forming a first conductive path connected to the first input node;
forming a second conductive path connected to the second input node; and,
forming a third conductive path connected to the output node, wherein the third conductive path comprises a third and fourth resistances, wherein each of the first, second, and third resistances is a heavy implant resistance, and wherein the fourth resistance is a light implant resistance.

33. The method of claim 32 wherein each of the heavy implant resistances has a first resistivity, wherein each of the light implant resistances has a second resistivity, and wherein a ratio of the first resistivity to the second resistivity is on the order of one to seven.

34. The method of claim 32 further comprising:
forming a bias resistance connected to the third and fourth resistances; and,
forming a feedback resistance connected to the third and fourth resistances, wherein the each of the bias and feedback resistances is a light implant resistance.

35. The method of claim 34 wherein each of the heavy implant resistances has a first resistivity, wherein each of the light implant resistances has a second resistivity, and wherein a ratio of the first resistivity to the second resistivity is on the order of one to seven.

36. The method of claim 32 wherein the fourth resistance covers a first area, wherein the third resistance covers a second area, and wherein a ratio of the number of squares of the first area to the number of squares of the second area is on the order of one to seven, and wherein the number of squares of the sum of the first and second areas is constant.

37. The method of claim 36 wherein each of the heavy implant resistances has a first resistivity, wherein each of the light implant resistances has a second resistivity, and wherein a ratio of the first resistivity to the second resistivity is on the order of one to seven.

38. The method of claim 36 further comprising:
forming a bias resistance connected to the third and fourth resistances; and,
forming a feedback resistance connected to the third and fourth resistances, wherein the each of the bias and feedback resistances is a light implant resistance.

39. The method of claim 38 wherein each of the heavy implant resistances has a first resistivity, wherein each of the light implant resistances has a second resistivity, and wherein a ratio of the first resistivity to the second resistivity is on the order of one to seven.

40. The method of claim 32 wherein the output node is coupled to an inverting input of an amplifier.

41. The method of claim 32 wherein first resistance has a first area, wherein the second resistance has a second area, and wherein the method further comprises customizing a ratio of the first area to the second area to a particular temperature range.

* * * * *

UNITED STATES PATENT AND TRADEMARK OFFICE
CERTIFICATE OF CORRECTION

PATENT NO. : 6,718,830 B1 Page 1 of 1
DATED : April 13, 2004
INVENTOR(S) : Russell L. Johnson It is certified that error appears in the above-identified patent and that said Letters Patent is hereby corrected as shown below:

Column 2,
Line 12, change "-0.25%°C" to -- -0.25%/°C --.

Column 8,
Line 5, change "-3°C" to -- -30°C --.

Signed and Sealed this

Twenty-first Day of December, 2004

JON W. DUDAS
*Director of the United States Patent and Trademark Office*